United States Patent
Gonzales

(10) Patent No.: US 7,488,126 B2
(45) Date of Patent: Feb. 10, 2009

(54) CAMERA STABILIZER

(76) Inventor: Rolando Gonzales, 8981 Helenjames Ave., San Diego, CA (US) 92126

( * ) Notice: Subject to any disclaimer, the term of this patent is extended or adjusted under 35 U.S.C. 154(b) by 392 days.

(21) Appl. No.: 11/347,453

(22) Filed: Feb. 3, 2006

(65) Prior Publication Data

US 2006/0124814 A1    Jun. 15, 2006

Related U.S. Application Data

(63) Continuation-in-part of application No. 11/080,081, filed on Mar. 14, 2005, which is a continuation-in-part of application No. 10/916,910, filed on Aug. 12, 2004, now Pat. No. 7,097,368, which is a continuation-in-part of application No. 10/671,977, filed on Sep. 26, 2003, now Pat. No. 7,000,879.

(51) Int. Cl.
  *G03B 17/56*  (2006.01)
(52) U.S. Cl. ............... 396/423; 396/428; 348/376; 248/298.1
(58) Field of Classification Search ......... 396/419–428; 248/298.1
  See application file for complete search history.

(56) References Cited

U.S. PATENT DOCUMENTS

| | | | |
|---|---|---|---|
| 2,552,205 A | 5/1951 | Moss | 95/86 |
| 2,753,778 A | 7/1956 | Tolcher | 294/139 |
| 2,806,416 A | 9/1957 | Jones | 95/86 |
| 4,244,500 A | 1/1981 | Fournier | 224/265 |
| D302,561 S | 8/1989 | Goins | D16/242 |
| 4,943,820 A | 7/1990 | Larock | 354/82 |
| 4,963,904 A * | 10/1990 | Lee | 396/423 |
| 5,332,136 A | 7/1994 | Rudolph | 224/185 |
| D382,286 S | 8/1997 | Doran | D16/242 |
| 5,806,734 A * | 9/1998 | Scott | 224/265 |
| 6,517,133 B2 | 2/2003 | Seegmiller et al. | 294/139 |
| 7,191,923 B1 * | 3/2007 | Kundig | 224/257 |

FOREIGN PATENT DOCUMENTS

EP      0122332 A1    10/1984

OTHER PUBLICATIONS

Advertisement for Camera Supports, B.H. Photo Video [www.bhphotovideo.com], Mar. 2003.

* cited by examiner

*Primary Examiner*—W. B. Perkey
*Assistant Examiner*—Fang-Chi Chang
(74) *Attorney, Agent, or Firm*—Frank G. Morkunas

(57) ABSTRACT

A camera stabilizer having a base onto which a camera is mountable. Two support members attach to the base by adjustable rods on each support member. A void in the base component facilitates placement of a user's hand therethrough for camera lens or other adjustments. A leveling device on the stabilizer permits a user to obtain a horizontally true picture. A mirror on the stabilizer permits a user to direct an external remote control device from the rear, onto the mirror, and reflected into a photosensor on the camera.

3 Claims, 4 Drawing Sheets

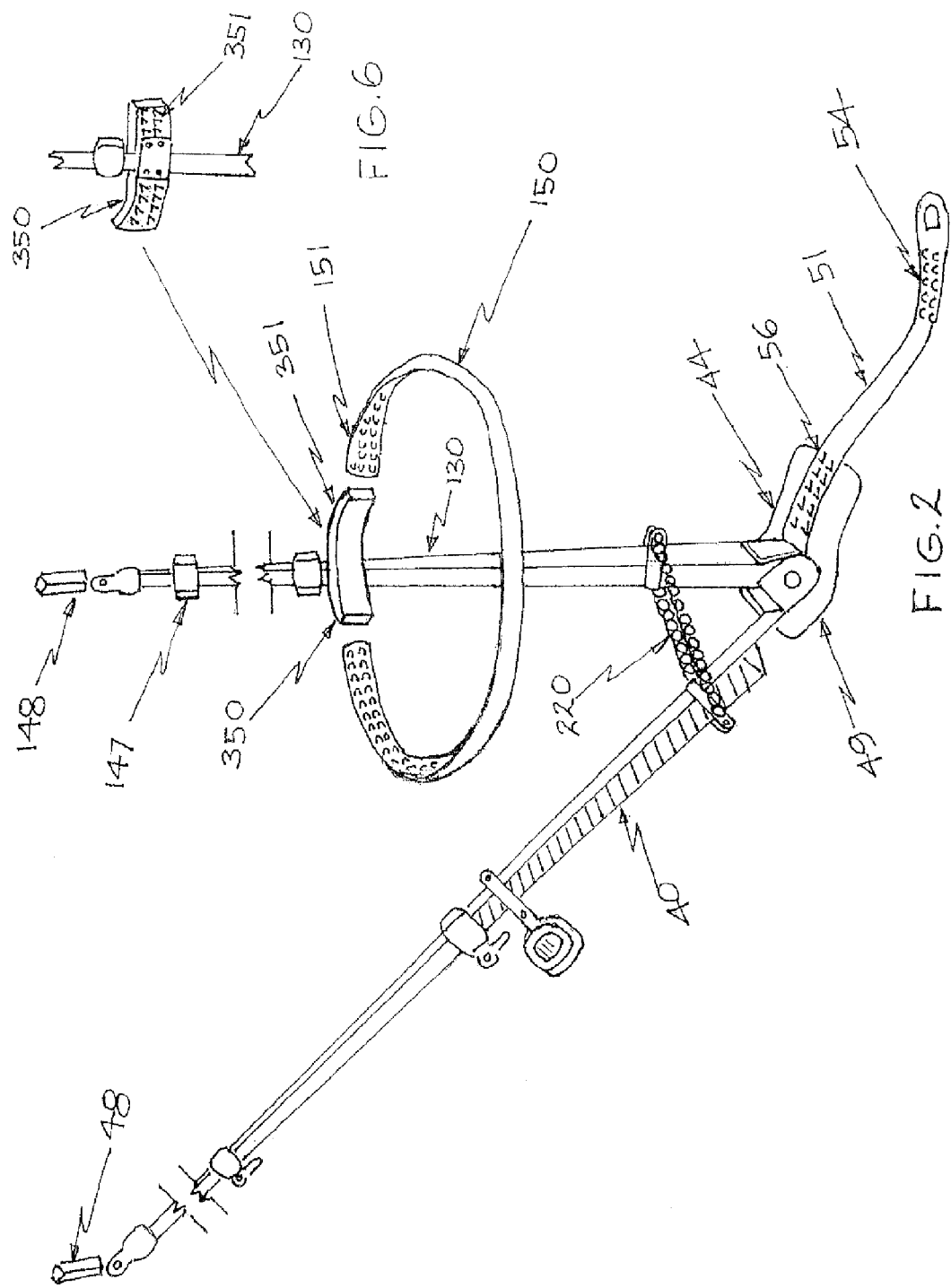

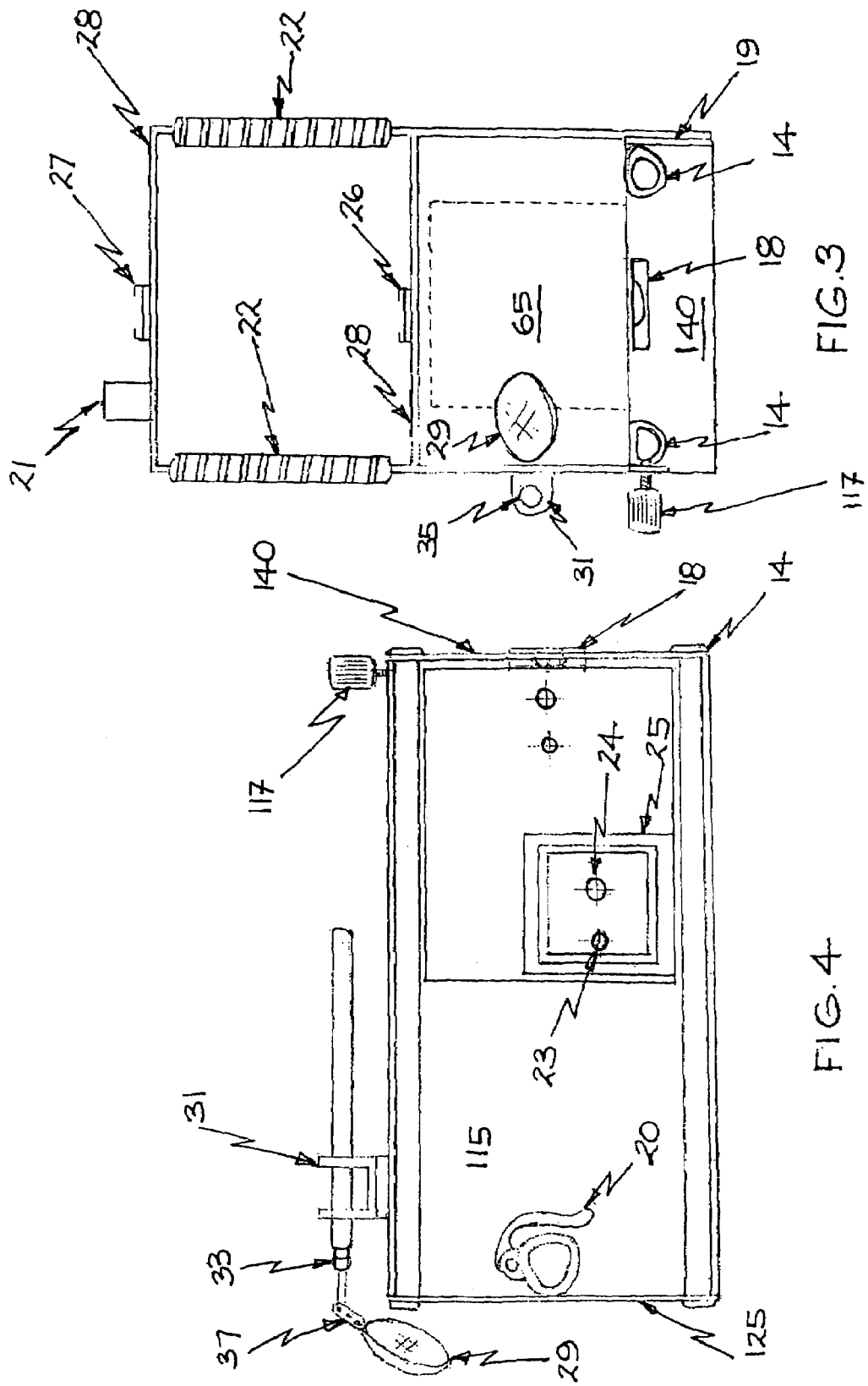

CAMERA STABILIZER

CROSS REFERENCES TO RELATED APPLICATIONS

This application is a continuation-in-part of my co-pending applications, application Ser. No. 11/080,081, filed on Mar. 14, 2005, which was a continuation-in-part application of application Ser. No. 10/916,910, filed on Aug. 12, 2004 now U.S. Pat. No. 7,097,368, which was a continuation-in-part application of application Ser. No. 10/671,977, filed on Sep. 26, 2003 now U.S. Pat. No. 7,000,879.

STATEMENT REGARDING FEDERALLY-SPONSORED RESEARCH OR DEVELOPMENT

None.

BACKGROUND OF THE INVENTION

This present invention relates to an improvement in camera supports and more particularly to camera stabilizers.

A steady camera for still pictures or moving pictures [movie camera or video camera] makes for better more professional finished pictures. A camera for still pictures, because of its shutter speed, can be hand-held and still be capable of capturing a good quality picture. For more professional results, tripods are generally used.

Holding a moving camera or video camera by hand to capture moving pictures can typically yield a 'jittery' result [for the purpose of all further discussion, such moving pictures will be referred to herein as 'video' and the device as 'video camera' and includes all types of cameras capable of capturing and presenting moving pictures—it must be understood, however, that the camera stabilizer of the present invention may be used with all types of cameras; still, moving, 35 mm, digital, and the like]. Tripods can be used but, once set up, their use is limited in scope in that once the tripod is set on the ground, it generally stays put and the camera operator swivels the mounted camera up and down and back and forth as needed. Should an event require the camera operator to move about to better capture the moments, the end result of the video will be jittery.

Various, more portable and mobile, camera supports and stabilizers have been crafted to meet the needs of the video camera operator to minimize or completely eliminate the jitter effect when recording moving events and moving with the event to better capture it. Most typically involve some form of adjustable rod attachable to the video camera with some form of support structure[s] mountable onto a camera operator. In many different forms, these generally involve some form of telescoping rod from video camera to the operator at or near the operator's shoulder with another telescoping rod from video camera to the operator at or near the operator's waist or chest thereby forming a triangular support structure well-suited for stabilizing the video camera.

All the prior art camera support devices are either complicated in structure and use; costly to manufacture and, concomitantly, costly to buy; and, in spite of the complexities of the device and high cost, do not offer flexibility of use nor do they provide for greater versatility in use. Most merely support the video camera without according the user more features necessary to produce more professional results. The present invention fills that void.

Accordingly, several objects and advantages of my invention are to:

a. provide an advantage for near- and far-sighted users to permit either to easily use either an LCD monitor for viewing or the viewfinder of the video camera;

b. produce an inexpensive camera stabilizer which provides excellent vertical and horizontal support for a video camera;

c. introduce a camera stabilizer which easily assembles and dis-assembles;

d. provide for a camera stabilizer which is easily adjustable and extremely easy to use;

e. provide for a camera stabilizer which is easily attachable to a user;

f. provide a camera stabilizer which facilitates the use of remote control devices and other camera-related components;

g. create a camera stabilizer which assists the camera operator in registering a level plane; and h. make an easily portable and storable camera stabilizer capable of easy storage and movement from one site to another site.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a camera stabilizing device having a base component onto which a camera is mountable and at least two support members attached to the base by adjustable rods on each support member. A void in the base component facilitates placement of a user's hand therethrough for camera lens or other adjustments. A mounting shoe on the base component facilitates mounting a camera thereon and a removable spacer between the base component and the mounting shoe accommodates varying sizes of camera. A leveling device on the stabilizer permits a user to obtain a horizontally true picture. A mirror on the stabilizer permits a user to direct an external remote control device from the rear, onto the mirror, and reflected into a photosensor on the camera.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 2 is a detailed view of a second support component of the camera stabilizer.

FIG. 3 is rear elevation view of the base component of the camera stabilizer.

FIG. 4 is a bottom plan view of the base component of FIG. 1.

FIG. 6 is a detailed view of the reverse side of the cushion plate.

DETAILED DESCRIPTION OF THE INVENTION

Figure 1:
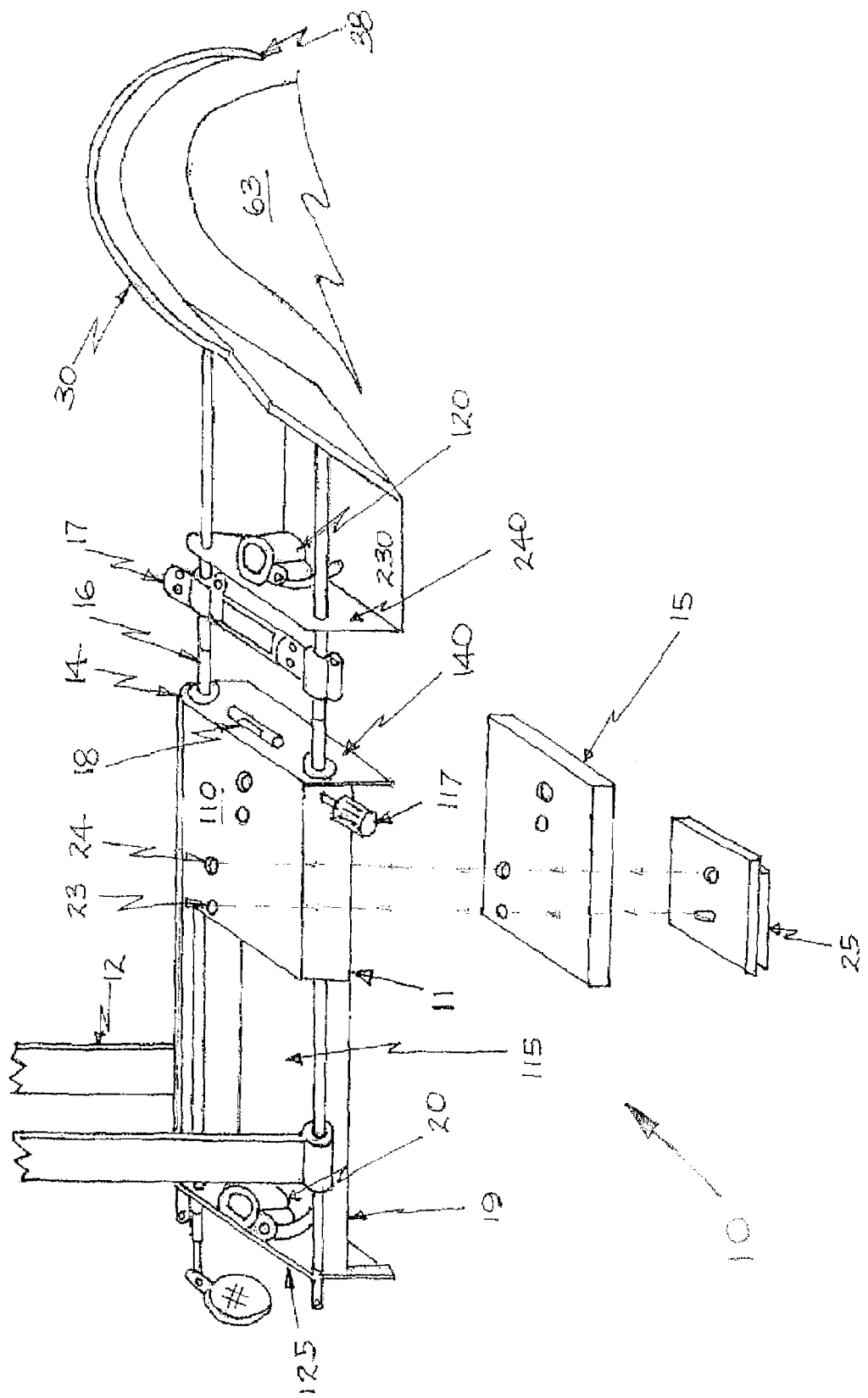
FIG. 1 is an exploded perspective view of the first support component of the camera stabilizer.

Referring now to the drawings in detail and in particular to FIG. 1, reference character 10 generally designates a camera stabilizer constructed in accordance with a preferred embodiment of the present invention. The base component 11 supports and secures a camera. This base component 11 has a front plate 125 [preferably vertically disposed], a base plate 110 [camera support section], a rear plate 140 [preferably vertically disposed], and a void 115 between the base plate 110 and the front plate 125. Most cameras have a threaded aperture on their bottom for mounting the camera onto a tripod for example. In this regard, the camera may be placed on top of the base plate 110, aligned with aperture 24, and secured thereon by a correspondingly threaded bolt.

Additionally a tripod mounting shoe 25, with its threaded bolt, may be incorporated onto the bottom of the base plate 110, to accept and secure a camera mounted onto the top of the base plate 110. The tripod mounting shoe 25 envisioned for this purpose is a conventional quick-release tripod mounting shoe; i.e., one which easily attaches to and releases from a tripod by movement of a single lever and, concomitantly, easily attaches to and releases from the bottom of the base plate 110. Most such tripod mounting shoes 25 also have an alignment guide-pin which, when placed onto the tripod, align with a receiving aperture on the tripod thereby registering the fit of the tripod mounting shoe onto the tripod.

To accommodate various size cameras and different types of tripods, an insertable and removable spacer 15 may be included and placed in between the mounting shoe 25 and the base plate 110. The spacer 15 may be of different thicknesses to clear the sides 19 if necessary and to permit attachment of the mounting shoe 25 to the base component 11 for proper use.

To accommodate such guide-pins, the base plate 110 is configured with an alignment aperture 23. This permits easy attachment of the tripod mounting shoe 25 onto the bottom of the base plate 110 and for easy and quick securement of a camera to the top of the base plate 110. At the rear plate 140 of the base component 11, and visible to a user, is leveling device 18, such as, but not limited to a bubble-type level.

When the camera stabilizer 10 is fully assembled, with camera attached, and is attached to the user 63, this permits a user to establish a perfect horizontal plane when the situation may call for such.

Figure 5:
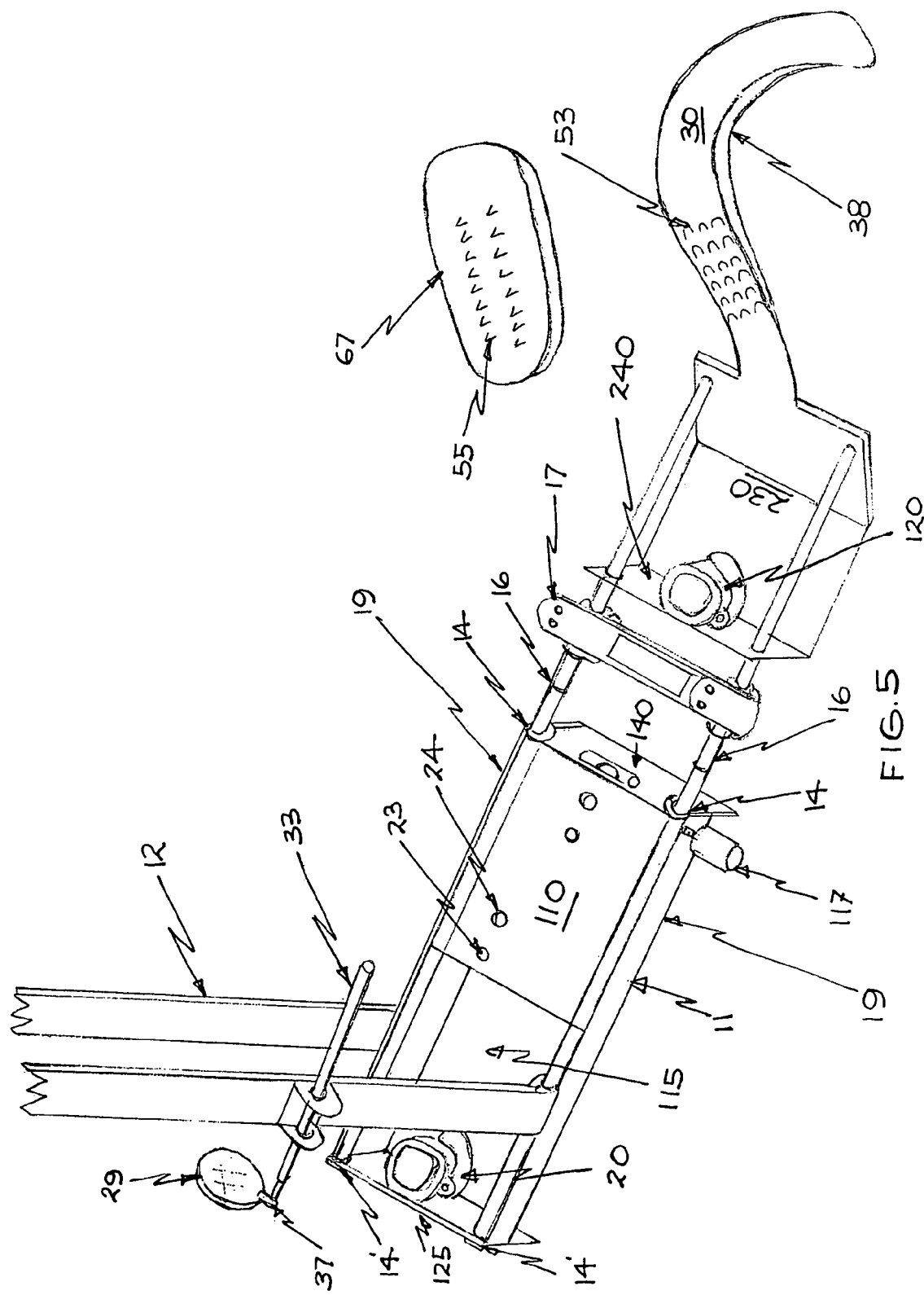
FIG. 5 is a perspective view of the base illustrating additional features of the first support component of the camera stabilizer.

At or near to the front plate 125 of the base component 11 is a reflective device 29 [illustrated in FIGS. 3-5] the purpose of which is to reflect the transmission of a signal from a remote control device for an external object [e.g., a video camera] to that external object [the video camera].

A side plate extends downward from either or both sides 19 of the base component 11, from front plate 125 to rear plate 140, provides support and comfort for a user's hand and accommodates a locking member 117 for the rods 16. Typically video cameras have a strap on the side of the video camera into which a user may insert the user's fingers with the palm-side against the video camera.

Also, typically, the thumb of the user is outside of the strap. This side plate provides a place to support the user's hand when the hand is inserted into the strap of the video camera. This side plate also permits the user to better manipulate the video camera as attached to the base plate 110. This side plate may, but need not, run the full length of the base component 11 from front plate 125 to rear plate 140 on either side or both sides of the base component 11.

As described above, there is a void 115 in the base component 11. The void 115 serves to permit a user to insert the user's hand therethrough to adjust the camera lens or perform other adjustments as necessary. Without the void, a user must run the user's hand around the base and 'reach' toward the camera to adjust the lens. Eliminating the need to 'reach' eliminates the potential jitter and maintains a steady even video capture.

A pair of adjustable rod members 16 extend from the rear plate 140 of the base component 11 to a support member 30. Support member 30 is adapted to rest on the user's 63 shoulder. As illustrated it is contoured on the bottom 38 to fit onto the user's shoulder. This contoured bottom 38 should be made of a soft or pliable material to provide a cushioned support and comfort for the user.

Another support member 130, which is a telescoping member, is adapted to attach at its top 148 to an attachment member 120 to the rear of the base component 11 [as shown in FIG. 1] and to the user by means of a belt or strap 150, which may be permanently affixed to the support member 130 or fully removable therefrom. The strap 150 has a fastening member 151 on at least one surface. The bottom of this support member 130 [not illustrated] may be place into a belt worn by the user or supported by any external means chosen by the user. Or, as in my pending applications, Ser. Nos. 10/916,910 and 11/080,081, which are hereby incorporated by reference into this application, it may attach to a swiveling second telescoping rod which at its upper end, attached to the front attaching member 20 at the front plate 125 of the base component 11.

Between the top 148 and the bottom of the support member 130 is a locking member 147 to lock in place any point at which the support member 130 is extended for use. Also between the top 148 the bottom of this support member 130 is a plate 350, preferably contoured or cushioned. On its one side, the plate 350 has a fastening member 351 which cooperates with the fastening member 151 on the strap 150 [reference also should be made to FIG. 6].

The fastening members 151, 351 may be corresponding hook-and-loop type or cooperating hook-and-eye type, or cooperating snap type and either component may be on the strap 150 or on the plate 350 provided that is cooperative component is on the other; i.e., plate 350 to strap 150, or strap 150 to plate 350.

Therefore, with the camera mounted on the base component 11; the shoulder support member 30 [or first support member], with its weight and the weight of the camera, resting on the user 63; and the support member 130 attached to the bottom of the base plate 110 at its top 148 and to the user 63 at its bottom [or to the swivel component described above]

and around the user utilizing the strap 150 attached at each end to the plate 350; the user may easily adjust the distances necessary, back and forth, for proper use as to base component 11 to first support member 30 and adjust the distances necessary, up and down by telescoping the second support member 130 according, for proper use as to base component 11 to the support member 130, and may make the strap 150 as tight or loose as is convenient around the user.

FIGS. 1 and 5 illustrate additional features of this stabilizer 10 which illustrate the details of the first support member 30. In this embodiment, there are two rods 16 attached to a rear plate 140 vertically disposed at the rear of the base component 11 and also attached to the support member 30 through a front plate 240 vertically disposed on a horizontal base plate 230 on this support member 30. The rods 16 attached to the rear plate 140 through the rear receiving apertures 14. For greater stability, the rods 16 continue forward to and through front receiving apertures 14" at the front plate 125 of the base component 11.

FIG. 3 illustrates yet additional features of the camera stabilizer 10. This figure highlights the features of the base component 11 as viewed from the rear. The level 18 is at the rear. The rods 16 are of the telescoping type and may be moved forward and backward to suit a user's needs or preferences.

The rods 16 are permanently affixed to the base component 11 at and through the rear plate 140 or at and through the front plate 125 or both. Since they telescope, once the desired position is attained, a set of tandem locking members 17 may be engaged to thereby lock that position of the rods 16. Additionally, a second locking member, such as a locking screw 117 on one or both sides 19, may be screwed inward onto the rods 16 for even greater locking power and stability.

An external object [camera] is illustrated in phantom line as reference character 65. Extending upward from the base component 11 is a support handle 12. One or more such support handle 12 may extend upward from the base component 11.

The purpose of the support handle 12 is to aid the user in holding, gripping, and maneuvering the camera to and toward objects of interest to be captured on film. Two such support handles 12 are shown and at least two are best suited for the intended purpose. One or more horizontally disposed extension 28 extend from the support handle 12 on one side of the base component 11 to the support handle 12 on the opposite side of the base component 11. A camera accessory mounting shoe 26, 27 may be on any one or more of the horizontal extensions 28 as well as a video light holder 21. These mounting shoes 26, 27 are adapted to receive any conventional camera accessory such as, but not limited to, a flash and a light meter.

It is preferred that there be at least two support handles 12 and that there be at least two horizontal extensions 28 connecting to each support handle 12 as illustrated in FIG. 3. A gripping member 22 may be on either or both support handles 12. It is best that the gripping member 22 be soft and not slick for its purpose is to permit the user to obtain a sure grip on the camera stabilizer 10. This gripping member may be foam [covered or uncovered], cushion, tape, rope, or string and it may be made of any material suited for the intended purpose.

With this embodiment, the first support member 30 also may have on its top, a coupling component 53 onto which an external object may be attached. If a video camera 65 is used as the object supported on the base component 11, a suitable external object for the video camera 65 may be a remote control device 67. The coupling component 53 of choice is hook-and-loop. As illustrated the loop element is represented by reference character 53 and is on the first support member 30 while the hook element is represented by reference character 55 and is on the remote control device 67 [though the corresponding coupling components may be reversed; i.e., hook element on the first support member 30, loop element on the remote control device 67].

For many video cameras, having the remote control 67 positioned as such simplifies the operation of the camera in that, the controls on the video camera itself for many video cameras are not well placed for ease of operation with or without use of a tripod or camera stabilizer or support. Remote control devices 67, on the other hand, are more user-friendly. Therefore, having the capability of using a remote control device 67 with a video camera 65 mounted onto the camera stabilizer 10 of the present invention clearly simplifies use of the video camera 65 in conjunction with the camera stabilizer 10.

The reflective device [mirror] 29 permits this to happen. The remote control device 67 must be placed and positioned onto the first support member 30 such that the signal the remote control device 67 transmits can be reflected off the mirror 29 and onto the photosensor of the receiving component; i.e., the camera 65 of such signal.

The reflective device 29 is on a swivel hinge 37 which is attached to a telescoping rod 33. The rod 33 is attached to either side 19 of the base component 11 by a receiving member 31 thereon. The receiving member 31 has a suitable aperture 35 thereon which accepts the rod 33.

This present camera stabilizer also may have, as in my prior applications, a third support member 40 which in combination with the second support member 130 has a bottom end 44 and a pivot point 49 at the bottom end 44. A biasing member 220 on the second support member 130 and the third support member 40 exerts biasing force to bring the two support members together. This facilitates movement by the user and dis-assembly.

At the bottom end 44 is attached a belt strap 51 for slipping through a belt or trouser belt-loop of a user [neither shown] and returning to the bottom end 44 for securing. At the end of the belt strap 51 is an attachment component 54, such as a hook or an eye of a velcro-type fastening component and adjacent to the bottom end 44 where the belt strap is attached to the bottom end 44 is a cooperating attachment component 56 of attachment component 54.

The top 48 of the third support member 40 is removably attachable to the attaching member 20 at the front plate 125 of the base component 11. This third support member 40, with belt strap 51 provides even greater stability for a user.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A camera stabilizer comprising:
   (a) a base component having a front, a rear, and a camera support section at said rear and a void approximately equal in area to said camera support section;
   (b) first support means permanently attached to said base component by at least two telescoping rods, said first support means for placing on a user's shoulder, for adjusting for front and rearward distance, and for providing stabilizing support;

(c) second support means having a top and a bottom and being telescopingly adjustable in height, wherein said top is removably attachable to and from an attachment member adjacent to the rear of said base component, said second support means for attaching to a user's mid-section, for adjusting height distance, and for providing stabilizing support, further comprising a cushion means distal from said bottom, said cushion means for placing next to a user's mid-section and for relieving from said user's mid-section pressure or weight being exerting by the camera stabilizer on said user, and further comprising attachment means on said cushion means for receiving and maintaining thereon an external strap having a first end with a first cooperating attachment member to said attachment means and a second end with a second cooperating attachment member to said attachment means, wherein said first end is attached to said attachment means, the external strap placed around a user's back, and the second end is attached to said attachment means.

2. The camera stabilizer as claimed in claim 1 wherein said camera support section has a bottom and on said bottom further comprises a mounting shoe for mounting a camera thereto and a removable spacer attachable between said mounting shoe and said bottom.

3. The camera stabilizer as claimed in claim 1 wherein said first support means further comprises a tandem locking member on said at least two telescoping rods for locking said at least two telescoping rods after a front or rearward distance adjustment has been made.

* * * * *